United States Patent
Trossell

(10) Patent No.: US 10,264,105 B2
(45) Date of Patent: Apr. 16, 2019

(54) TRANSMITTING DATA

(71) Applicant: Bridgeworks Limited, Hampshire (GB)

(72) Inventor: David Trossell, Hampshire (GB)

(73) Assignee: Bridgework Limited, Hampshire (GB)

( * ) Notice: Subject to any disclaimer, the term of this patent is extended or adjusted under 35 U.S.C. 154(b) by 0 days.

(21) Appl. No.: 15/574,035

(22) PCT Filed: May 26, 2016

(86) PCT No.: PCT/GB2016/051525
§ 371 (c)(1),
(2) Date: Nov. 14, 2017

(87) PCT Pub. No.: WO2016/193675
PCT Pub. Date: Dec. 8, 2016

(65) Prior Publication Data
US 2018/0302503 A1    Oct. 18, 2018

(30) Foreign Application Priority Data

Jun. 3, 2015   (GB) .................................. 1509649.8

(51) Int. Cl.
*H04L 29/06* (2006.01)
*H04L 12/26* (2006.01)
(Continued)

(52) U.S. Cl.
CPC ........ *H04L 69/166* (2013.01); *H04L 43/0888* (2013.01); *H04L 47/365* (2013.01);
(Continued)

(58) Field of Classification Search
CPC . H04L 69/166; H04L 47/365; H04L 43/0888; H04L 65/80; H04L 69/16;
(Continued)

(56) References Cited

U.S. PATENT DOCUMENTS 10,075,233 B2 * 9/2018 Pechner ............. H04B 10/1123
2001/0015956 A1   8/2001 Ono
(Continued)

FOREIGN PATENT DOCUMENTS

EP    0984601 A2    3/2000
EP    1225736 A2    7/2002
(Continued)

OTHER PUBLICATIONS

Martikainen, "PHY and MAC Layer Performance Optimization of the IEEE 802.16 System", 2012, University of Jyvaskyla. (Year: 2012).*

(Continued)

*Primary Examiner* — Paul H Masur
*Assistant Examiner* — Michael K Phillips
(74) *Attorney, Agent, or Firm* — Banner & Witcoff, Ltd.

(57) ABSTRACT

A method comprises: initialising a value of an input transfer size parameter; initialising a value of a transfer data segment parameter; requesting data from a data source; storing the data in a cache; using the value of the transfer data segment parameter to form a data segment; transmitting the data segment using multiple logical connections of a transfer path deleting the data segment from the cache; measuring performance of transmission of data over the path and identifying a first optimum value of the transfer data segment parameter; measuring performance of transmission of data over the path and identifying a first optimum value of the input transfer size parameter; measuring performance of transmission of data over the path and identifying a second optimum value of the transfer data segment parameter; and requesting data from the data source using the first optimised value of the input transfer size parameter.

22 Claims, 7 Drawing Sheets

(51) Int. Cl.
*H04L 12/805* (2013.01)
*H04L 29/08* (2006.01)

(52) U.S. Cl.
CPC .......... *H04L 69/24* (2013.01); *H04L 67/1097* (2013.01); *H04L 69/14* (2013.01)

(58) Field of Classification Search
CPC ..... H04L 47/10; H04L 69/163; H04L 65/602; H04L 1/0007; H04L 47/193; H04L 67/1097; H04L 43/0882; H04L 47/27; H04L 47/283; H04L 65/605; H04L 69/24; H04L 69/14; H04N 21/23406; H04N 21/44209; G06F 17/30902; H04W 28/14
See application file for complete search history.

(56) References Cited

U.S. PATENT DOCUMENTS

| | | | | |
|---|---|---|---|---|
| 2002/0186660 | A1* | 12/2002 | Bahadiroglu | H04L 29/06 370/248 |
| 2006/0245452 | A1 | 11/2006 | Frederiksen et al. | |
| 2009/0046681 | A1* | 2/2009 | Kalogridis | H04W 72/1289 370/338 |
| 2010/0272078 | A1* | 10/2010 | Pani | H04W 28/06 370/336 |
| 2011/0090806 | A1* | 4/2011 | Ozturk | H04L 1/0007 370/252 |
| 2011/0280195 | A1* | 11/2011 | Muppalla | H04L 1/0007 370/329 |
| 2013/0176854 | A1* | 7/2013 | Chisu | H04W 80/06 370/241 |
| 2013/0268807 | A1* | 10/2013 | Spencer | H04L 65/4084 714/18 |
| 2015/0036511 | A1 | 2/2015 | Cheng | |
| 2015/0271231 | A1* | 9/2015 | Luby | H04L 65/4084 709/231 |
| 2015/0350299 | A1* | 12/2015 | Pineas | H04L 67/06 709/203 |
| 2016/0037364 | A1* | 2/2016 | Kairouz | H04W 24/08 370/252 |
| 2016/0219458 | A1* | 7/2016 | Kubota | H04W 28/06 |
| 2016/0323342 | A1* | 11/2016 | Luby | H04N 21/23106 |
| 2018/0077217 | A1* | 3/2018 | Choi | H04L 29/08 |

FOREIGN PATENT DOCUMENTS

| | | |
|---|---|---|
| GB | 2472164 A | 1/2011 |
| GB | 2525534 A | 10/2015 |
| WO | 2006117613 A1 | 11/2006 |

OTHER PUBLICATIONS

Search Report of PCT/GB2016/051525 dated Jun. 30, 2016.
Combined Search and Examination Report of GB Application No. GB1509649.8, dated Dec. 8, 2015.
Combined Search and Examination Report of GB Application No. GB1602551.2, dated Jul. 4, 2016.
The Performance Impact of Block Sizes and Fetch Strategies, Steven Przybylski, MIPS Computer System, Sunnyvale, CA, , 1990 IEEE.

* cited by examiner

TRANSMITTING DATA

This application is a 371 National Phase of PCT/GB2016/051525, filed May 26, 2016, claiming priority to United Kingdom Application No. 1509649.8, filed Jun. 3, 2015.

FIELD

The specification relates to transmitting data, and in particular but not exclusively to transmitting data from a bridge.

BACKGROUND

The rate at which data can be transferred between network nodes using conventional methods can be limited by a number of factors. In order to limit network congestion and to ensure reliable transfers, a first node may be permitted to transmit only a limited amount of data before an acknowledgement message (ACK) is received from a second, receiving, node. Once an ACK message has been received by the first node, a second limited amount of data can be transmitted to the second node.

In Transmission Control Protocol/Internet Protocol (TCP/IP) systems, that limited amount of data relates to the amount of data that can be stored in a receive buffer of the second node and is referred to as a TCP/IP "receive window".

In conventional systems, the size of the TCP/IP receive window may be allowed to grow (the value may be allowed to increase) to take account of the round-trip time between the first and second nodes and the available bandwidth. The size of the TCP/IP window can influence the efficiency of the data transfer between the first and second nodes because the first node may close the connection to the second node if the ACK message does not arrive within a predetermined period (the timeout period). Therefore, if the TCP/IP window is relatively large, the connection may be "timed out". Moreover, the amount of data may exceed the size of the receive buffer, causing error-recovery problems. However, if the TCP/IP window is relatively small, all of the available bandwidth might not be utilised effectively. Furthermore, the second node will be required to send a greater number of ACK messages, thereby increasing network traffic. In such a system, the data transfer rate is also determined by time required for an acknowledgement of a transmitted data packet to be received at the first node. In other words, the data transfer rate depends upon the round-trip time between the first and second nodes and the value of the receive window size parameter for the connection. As the distance increases between the first and second nodes, the round trip time also increases. This further reduces network efficiency. In many discussions regarding TCP/IP the phrase Round Trip Time and latency are used to denote the same thing and are interchangeable.

The above shortcomings may be particularly significant in applications where a considerable amount of data is to be transferred. For instance, the data stored on a Storage Area Network (SAN) may be backed up at a remote storage facility, such as a remote disk or tape library located within another Storage Area Network (SAN). In order to minimise the chances of both the locally stored data and the remote stored data being lost simultaneously, the storage facility should be located at a considerable distance. In order to achieve this, the back-up data must be transmitted across a network to the remote storage facility. However, this transmission is subject to a limited data transfer rate. SANs often utilise Fibre Channel (FC) technology, which can support relatively high speed data transfer. However, the Fibre Channel Protocol (FCP) cannot normally be used over distances greater than 10 km, although a conversion to TCP/IP traffic can be employed to extend the distance limitation but is subject to the performance considerations described above. In the above example of data being transmitted between one SAN and another, the data flow is one storage related command followed another storage related command in a "single data stream". In a conventional data transmission appliance connected to a TCP/IP network we there is latency of a few milliseconds or more, the performance can drop to just a few percent of the maximum potential network path performance.

SUMMARY

A first aspect of the specification provides a method comprising:
a) initialising a value of a parameter relating to a size of a data segment;
b) providing a transmit buffer with a first data segment having a size equal to the first value of the parameter;
c) transmitting the first data segment over a path as plural network packets, each network packet being transmitted over a different one of plural logical connections;
d) moving a second data segment having a size equal to the value of the parameter to the transmit buffer;
e) transmitting the second data segment over the path as plural network packets, each network packet being transmitted over a different one of the plural logical connections;
f) measuring performance of transmitting data over the path when repeating steps d) and e) for further data segments;
g) changing the value of the parameter;
h) measuring performance of transmitting data over the path when repeating steps e) and f) for further data segments with the changed value of the parameter;
i) using measured performance of transmitting data over the path with different values of the parameter to determine an optimum value for the parameter; and
j) using the optimum value for the parameter when repeating steps d) and e) for still further data segments.

The method may comprise using the optimum value for the parameter when repeating steps d) and e) for further data segments until a trigger condition is detected, and responding to detecting the trigger event by performing steps h) and i) to determine a new optimum value for the parameter. The trigger condition may comprise a parameter change event.

The method may comprise performing step j) by determining a value of the parameter that provides maximum performance and setting the optimum value for the parameter as being different to the value of the parameter that provides maximum performance.

The method may comprise creating a new logical connection when there is part of a data segment transmitting over the path and there are no logical connections available for transmission.

The method may comprise destroying excess logical connections when the further data segment has been fully transmitted. The method may comprise identifying excess logical connections by determining that there are plural logical connections that have not been used in the transmission of the further data segment when the further data segment has been fully transmitted.

The method may comprise deleting the first data segment from the transmit buffer and moving the second data segment to the transmit buffer in response to determining that the first data segment has been successfully transmitted.

The method may comprise deleting the second data segment from the transmit buffer and moving the third data segment to the transmit buffer in response to determining that the second data segment has been successfully transmitted.

Alternatively, the method may comprise moving the second data segment to the transmit buffer and transmitting the second data segment whilst at least one of the plural logical connections of the path is awaiting an acknowledgment of a network packet of the first data segment, comprising transmitting the second data segment using ones of the plural logical connections for which acknowledgements of network packets of the first data segment are not awaited.

The method may comprise performing steps d) and e) for a period of time sufficient to allow the path to stabilise before performing step f).

In the method, g), h), i) and j) may comprise:
changing the value of the parameter in a first direction until performance is determined not to be improved, then changing the value of the parameter in the opposite direction until performance is determined not to be improved, and then saving the resulting performance value and/or using the resulting performance value until a trigger condition occurs.

A second aspect of the specification provides a method comprising:
initialising a value of an input transfer size parameter;
initialising a value of a transfer data segment parameter;
requesting data from a data source, the requesting using the value of the input transfer size parameter to indicate an amount of data requested;
storing data received from the data source in a cache;
using the value of the transfer data segment parameter to form a data segment from data stored in the cache;
transmitting the data segment using multiple logical connections of a transfer path, each logical connection carrying a different part of the data segment;
when it is confirmed that the data segment has been transmitted over the transfer path, deleting the data segment from the cache;
measuring performance of transmission of data over the path using different values of the transfer data segment parameter and identifying a first optimum value of the transfer data segment parameter;
whilst transmitting using the first optimum value of the transfer data segment parameter, measuring performance of transmission of data over the path using different values of the input transfer size parameter and identifying a first optimum value of the input transfer size parameter;
whilst transmitting using the first optimum value of the input transfer size parameter, measuring performance of transmission of data over the path using different values of the transfer data segment parameter and identifying a second optimum value of the transfer data segment parameter; and
requesting data from the data source using the first optimised value of the input transfer size parameter to indicate an amount of data requested and using the value of the second optimum value of the transfer data segment parameter to form data segments from data stored in the cache for transmission over the path.

The method may comprise, whilst transmitting using the second optimum value of the transfer data segment parameter, measuring performance of transmission of data over the path using different values of the input transfer size parameter and identifying a second optimum value of the input transfer size parameter.

The method may comprise measuring performance of transmission of data over the path using different values of the transfer data segment parameter in response to a first trigger event. The first trigger event may comprise a parameter change event.

The method may comprise measuring performance of transmission of data over the path using different values of the input transfer size parameter in response to a second trigger event. The second trigger event may comprise a parameter change event.

The method may comprise determining an optimum value of a parameter comprises determining a value of the parameter that provides maximum performance and setting the optimum value for the parameter as being different to the value of the parameter that provides maximum performance.

The specification also provides apparatus configured to perform any of the above methods.

The specification also provides machine readable instructions that when executed by computing apparatus cause it to perform any of the methods above.

BRIEF DESCRIPTION OF THE DRAWINGS

Embodiments of the present specification will now be described with reference to the accompanying drawings, in which.

DETAILED DESCRIPTION

Figure 1:
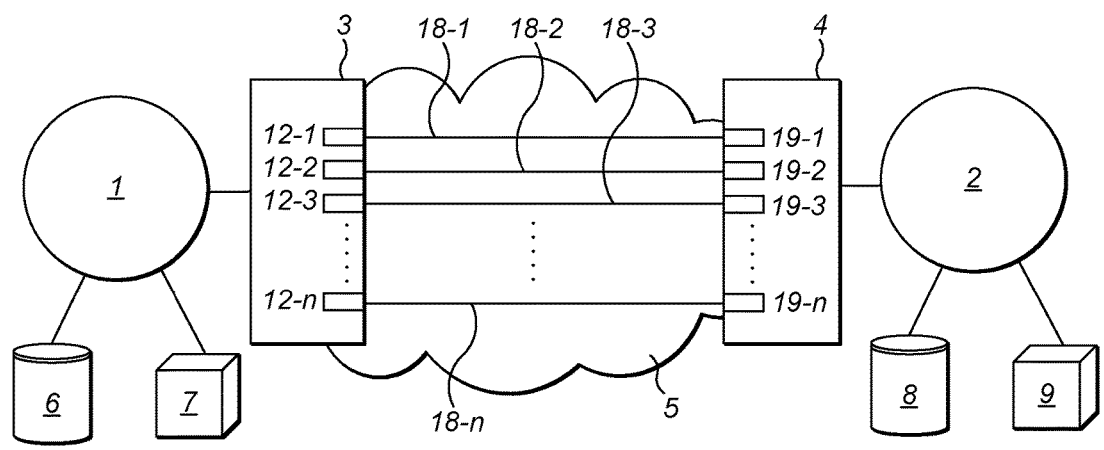
FIG. 1 depicts a system according to embodiments of the present specification.

In brief, a very significant increase in transmission speed over a high latency link can be achieved through a combination of features, as follows.

A value of an NTS (Network Transfer Size) parameter is used to determine the size parameter of IO vectors which define data segments that are stored in a buffer addressed by the dispatcher and provided to a transmitter module prior to transmission over a physical network path. An initial value for the NTS parameter is derived, for instance by multiplying a number of logical connections by a typical or sampled Receive Window Size Parameter. Performance is measured using the initial value of the NTS parameter to form the IO vector parameters in a buffer in the dispatcher. The length of the IO vector formed, and thus the data segment, has a size equal to the value of the NTS parameter. This IO vector is then provided from the dispatcher to the transmitter module for transmission over multiple software created logical connections associated with the physical network path. The value of the NTS parameter is adjusted until the path performance is maximised. For instance, the value of the NTS parameter is adjusted from its initial value in one direction (increased or decreased), and performance is then measured again. The changing of the value of the NTS parameter results in IO vectors that are differently sized to those before the change in value of the parameter being formed in the dispatcher and being provided to the transmitter module. A different IO vector size typically results in a change in performance of the transmission of data over the path. The performance of the path is measured with the new value of the NTS parameter. If the performance has decreased, the value of the NTS parameter is adjusted in the opposite direction, and performance is again measured. If the performance is determined to have increased, the value of the NTS parameter is adjusted in the same direction. This continues until performance is determined not to have increased, whereupon the value of the NTS parameter is recorded. This value of the NTS parameter is then used to set the size of IO vectors until a trigger condition occurs, whereupon the process is repeated to determine a new value for the NTS parameter.

Optimising the size of the data segment presented to the physical path using the logical connections is to maximise performance irrespective of the value of each logical connection's RWS parameter and minimising the number of connections, and to support other transmitters of data on the same path and differing network segment speed within the path.

The scheme disclosed herein approaches the calculation of the optimum performance of the path by ensuring the maximum data segment size that the network can sustain, irrespective of different line speed within a path segment or with other transmitters on the path.

This method works in conjunction with the process that calculates and controls the number of connections required to optimise the performance.

Simultaneously, a value of an Optimum Transfer Size (OTS) parameter is used to determine the quantity of data that is requested from a data source when the dispatcher has detected that a cache that feeds the transmission module has a need for more data. The value of the OTS parameter is used to create a request for data, or formulate a group of requests, that is provided to the data source when it is determined that the cache has a need for more data. Data is removed from the cache as it is vectored by the dispatcher to the transmission module. Whereas the value of the NTS parameter is calculated to maximise the utilisation of the physical network path, the value of the OTS parameter is calculated to ensure a steady flow of data from a data source to the dispatcher so that there as always data to be dispatched from the associated cache but is never so much data that data is held for sufficiently long in the cache that the data source believes that the data transmission has timed out and failed. Performance is measured using the initial value of the OTS parameter to request data from the source of data. The quantity of data requested from the data source has a size equal to the value of the OTS parameter. This data is then received into the cache, from where it is subsequently vectored by the dispatcher to the transmitter module as individual IO vectors. The value of the OTS parameter is adjusted until the path performance is maximised. For instance, the OTS parameter is adjusted from its initial value in one direction (increased or decreased), and performance is then measured again. The changing of the value of the OTS parameter results in a different quantity of data being requested from the data source when the cache needs more data. A different quantity of data being requested from the data source typically results in a change in performance of the transmission of data over the path to the destination. The performance of the path is measured with the new value of the OTS parameter. If the performance has decreased, the value of the OTS parameter is adjusted in the opposite direction, and performance is again measured. If the performance is determined to have increased, the value of the OTS parameter is adjusted in the same direction. This continues until performance is determined not to have increased, whereupon the value of the OTS parameter is recorded. This value of the OTS parameter is then used to set the quantity of data requested by the cache until a trigger condition occurs, whereupon the process is repeated to determine a new value for the OTS parameter.

FIG. 1 depicts a system according to embodiments of the present specification. In this particular example, the system includes a local Storage Area Network (SAN) 1, and a remote SAN 2. The remote SAN 2 is arranged to store back-up data from clients, servers and/or local data storage in the local SAN 1.

Two bridges 3, 4, associated with the local SAN 1 and remote SAN 2 respectively, are connected via a path 5. The bridges 3, 4 are examples of network nodes. The path 5 provides one or more physical paths between the bridges 3, 4. In this particular example, the path 5 is a path over an IP network and the bridges 3 and 4 can communicate with each other using the Transmission Control Protocol (TCP). The communication paths between the bridges 3, 4 may include any number of intermediary routers and/or other network elements. Other devices 6, 7 within the local SAN 1 can communicate with devices 8 and 9 in the remote SAN 2 using the bridging system formed by the bridges 3, 4 and the path 5.

Figure 2:
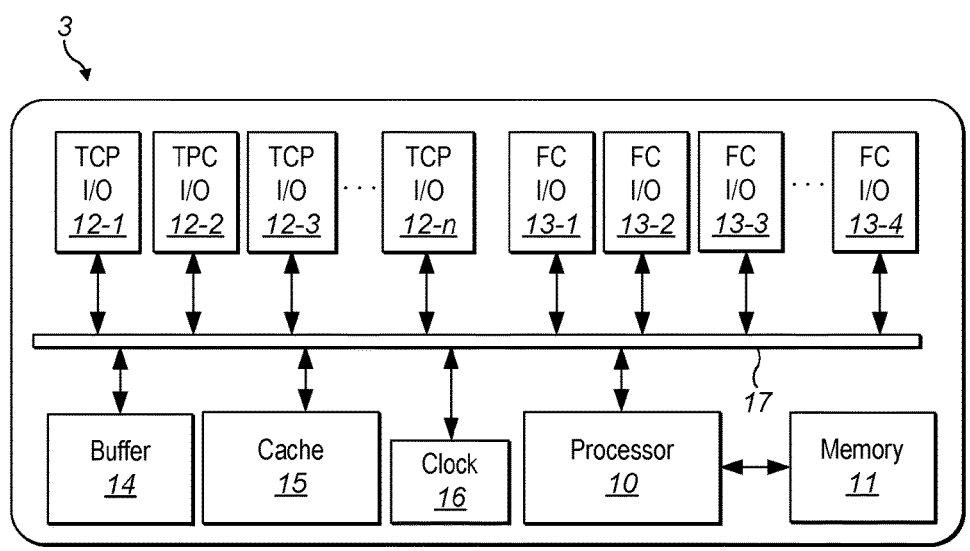
FIG. 2 depicts a node in the system of FIG. 1.

FIG. 2 is a block diagram of the local bridge 3. The bridge 3 comprises a processor 10, which controls the operation of the bridge 3 in accordance with software stored within a memory 11, including the generation of processes for establishing and releasing connections to other bridges 4 and between the bridge 3 and other devices 6, 7 within its associated SAN 1.

The connections between the bridges 3, 4 utilise IO ports 12-1~12-n, which are physical ports over which the TCP protocol is transmitted and received. A plurality of Fibre Channel (FC) ports 13-1~13-n may also be provided for communicating with the SAN 1. The FC ports 13-1~13-n operate independently of, and are of a different type and specification to, ports 12-1~12-n. The bridge 3 can transmit and receive data over multiple connections simultaneously using the ports 12-1~12-n and the FC Ports 13-1~13-n. Each of the ports 12-1~12-n and 13-1~13-n is associated with a different physical network path.

A plurality of buffers 14 are provided for storing data for transmission by the bridge 3. Plural caches 15 together provide large capacity storage while a clock 16 is arranged to provide timing functions. The processor 10 can communicate with various other components of the bridge 3 via a bus 17.

Figure 3:
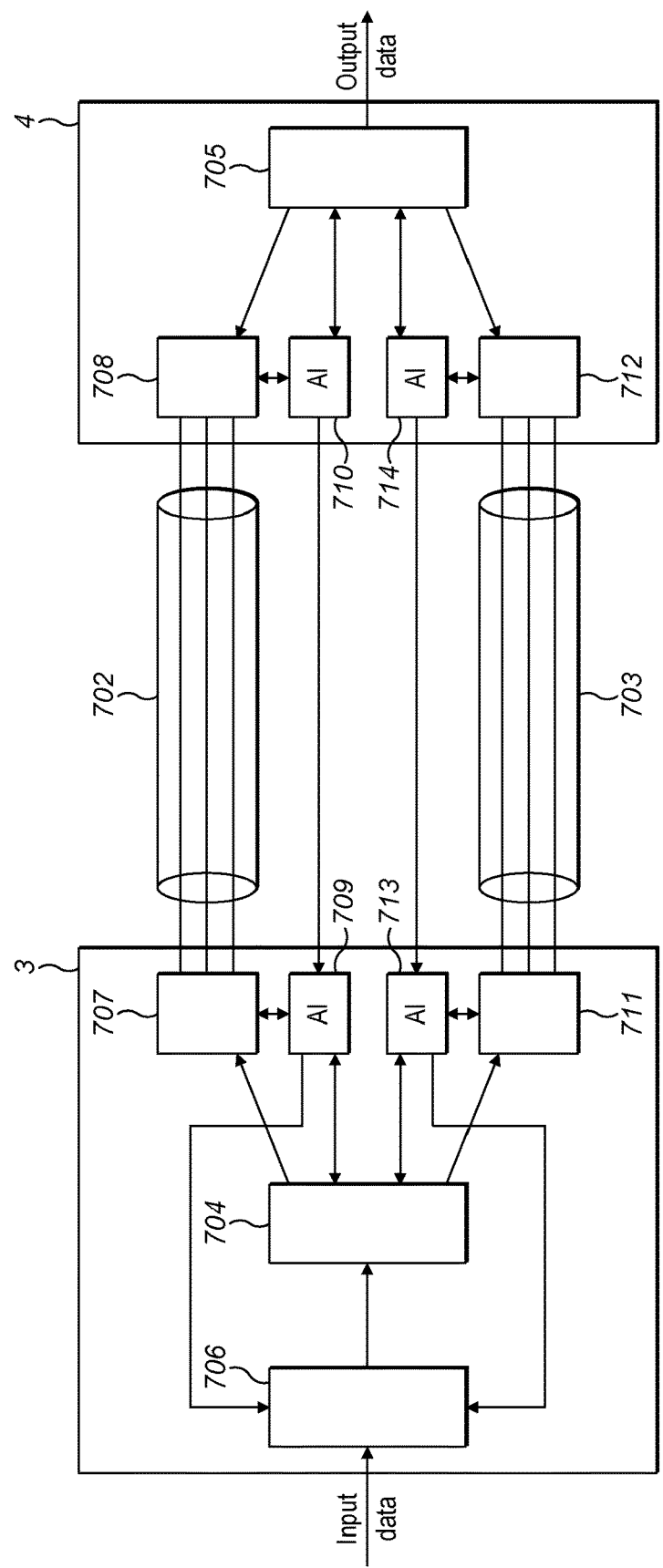
FIG. 3 is a schematic diagram illustrating a system according to embodiments of the present specification, and is an alternative to the system of FIG. 1.

FIG. 3 is a schematic diagram illustrating a system according to embodiments of the present specification in which the two bridges 3, 4, associated with the local SAN 1 and remote SAN 2 respectively, are connected via first and second paths 702, 703. Other features from the FIG. 1 system are present in the FIG. 3 system but are omitted from the Figure for improved clarity. These features include the plurality of IO ports **12-1~12-*n*, the Fibre Channel (FC) ports 13-1~13-*n*** etc.

The memory 11 stores software (computer program instructions) that, when loaded into the processor 10, control the operation of the local bridge 3. The software includes an operating system and other software, for instance firmware and/or application software.

The computer program instructions provide the logic and routines that enables the local bridge 3 to perform the functionality described below. The computer program instructions may be pre-programmed into the local bridge 3. Alternatively, they may arrive at the local bridge 3 via an electromagnetic carrier signal or be copied from a physical entity such as a computer program product, a non-volatile electronic memory device (e.g. flash memory) or a record medium such as a CD-ROM or DVD. They may for instance be downloaded to the local bridge 3, e.g. from a server.

The processor 10 may be any type of processor with processing circuitry. For example, the processor 10 may be a programmable processor that interprets computer program instructions and processes data. The processor 10 may include plural processors. Each processor may have one or more processing cores. The processor 10 may comprise a single processor that has multiple cores. Alternatively, the processor 10 may be, for example, programmable hardware with embedded firmware. The processor 10 may be termed processing means.

The remote bridge 4 is configured similarly to the local bridge 3, and FIG. 2 and the above description applies also to the remote bridge 4.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM, etc. Examples of non-volatile memory include ROM, PROM, EEPROM, flash memory, optical storage, magnetic storage, etc.

The local bridge 3 and the remote bridge 4 as shown in FIG. 3 include a number of interconnected components. The bridges 3, 4, which will now be described with reference to FIG. 3, which allows operation of the bridges and their interworking to be explained.

Input data is received and stored in memory under control of a data cache 706 in the local bridge 3. This is the cache 15 at FIG. 2. One data cache 706 is provided for each storage device 8, 9 that is connected to the remote bridge 4. To simplify the following description, the operation of a single data cache 706 will be described. The input data is received as discrete data cache elements. The data cache elements in the input data are in the form in which they were received on the host interface (e.g. the FC interface 13), although with the protocol removed/stripped by the bridge 3. The data cache elements are data that is required to be communicated to the remote bridge 4. The data cache elements may be packets of data, but they should not be confused with the data segments that are discussed in this specification. The data cache elements include headers that contain a description of the data, its source and destination, size and memory vectors.

A number of data cache elements may be requested from the hosts in one sequence. For example, the Fibre Channel interface may request five write command transactions from the host 1. The number of requested cache elements is defined by the value of an OTS parameter, which is determined by the AI 709, 713. The request of data cache elements based on the OTS parameter enhances the throughput and efficiency of the transfer of data between the local and remote bridges 3, 4 and the connected devices 8, 9.

An output of the data cache 706 is connected to an input of a dispatcher 704. As such, input data parameters are provided to the dispatcher 704 by the data cache 706. The dispatcher is an example of a data controlling module.

The input data is stored in memory in the local bridge 3 and is managed by the data cache 706. The data cache 706 manages the storage etc. of commands and data that pass in both directions, that is to say from the SAN 1 to the SAN 2 and vice versa. The cache 706 manages protocol interaction with the SANs 1, 2 or other hosts. Examples of actions performed by the cache 706 include receiving write commands, opening channels to allow a host to write data, etc.

From the dispatcher 704, the input data may be provided either to a first path transmitter interface 707 or a second path transmitter interface 711.

The first path transmitter interface 707 is connected via the path 702 to a first path receiver interface 708 in the receiver. Similarly, the second path transmitter interface 711 is connected by the second path 703 to a second path receiver interface 712 in the remote bridge 4. For clarity, only one data transmission direction (from the local bridge 3 to the remote bridge 4) is shown in FIG. 3. In practice, an identical transmission path exits in the other opposite direction, from the remote bridge 4 to the local bridge 3. Each of the paths 702, 703 has one physical port 12, 19 at each of the bridges 3, 4.

Figure 4:
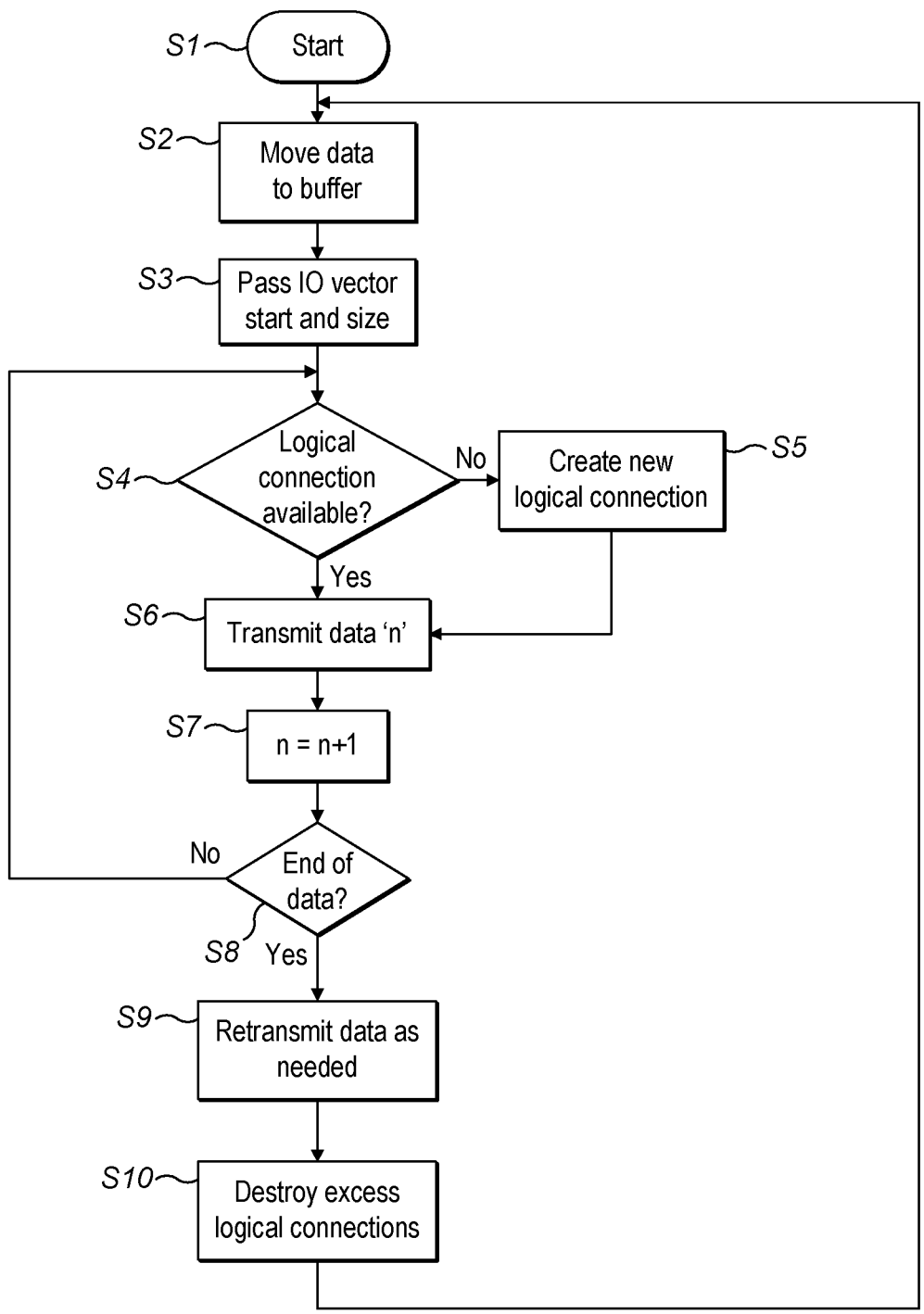
FIG. 4 is a flowchart illustrating a method of transmitting data between a transmitter and a receiver according to embodiments of the present specification.

Each of the paths 702, 703 includes multiple software-created logical connections. These logical connections may be provided as described below with reference to FIG. 4. In either case, the number of logical connections is selected so as to provide suitable performance of data transfer over the respective path, 702, 703. In FIG. 4, the number of logical connections is managed so as to optimise performance.

Two of the ports **12-1~12-*n* shown in the bridge 3 of FIG. 1 is represented by the first and second transmitter interface 707, 711 of FIG. 3. Corresponding two ports of the ports 19-1~19-*n* are represented by the first and second path receiver interfaces 708, 712 of the remote bridge 4**.

A first path transmitter artificial interface (AI) module 709 is provided in the local bridge 3. The first path transmitter AI module 709 is coupled in a bi-directional manner to both the first path transmitter interface 707 and the dispatcher 704. Additionally, it is connected to receive signalling from a first path receiver AI module 710, which is located in the remote bridge 4. The first path receiver AI module 710 is coupled in a bi-directional manner both to the first path receiver interface 708 and to the output cache 705.

Similarly, a second path transmitter AI module 713 is located in the local bridge 3, and is connected in a bi-directional manner both to the second path transmitter interface 711 and to the dispatcher 704. A second path receiver AI module 714 is located in the remote bridge 4, and is bi-directionally coupled both to the output cache 705 and to the second path receiver interface 712. The second path AI module 713 is connected to receive signalling from the second path receiver AI module 714.

The dispatcher 704 is configured to determine which of the first path transmitter interface 707 and the second path transmitter interface 711 is to be provided with data segments for transmission over its respective path 702, 703. Operation of the dispatcher 704 and what constitutes a data segment is described in detail below.

In the remote bridge 4, a combiner/cache 705 is provided. The combiner/cache 705 provides the function of a cache and the function of a combiner. Alternatively, separate modules may be included in the remote bridge 4 such as to provide these functions. Output data is stored in memory in the receiver 708 and is managed by the cache/combiner 705.

The combiner/cache 705 causes the combining of data that is received over the first and second paths 702, 703 within the output cache 705. The data is combined by the combiner 705 such that the output data that results from the cache 705 comprises data segments in the correct order, that is it is in the order in which the at a segments were received as input data at the local bridge 3. The combination of data within the output cache 705 is performed by the combiner 705 based on the examination of headers.

In order to transfer data, multiple logical connections are established for each physical connection between a pair comprising one of the ports 12-1~12-n of the local bridge 3 and a corresponding port 19-1~19-n of the remote bridge 4, i.e. for each physical network path. Multiple logical connections for the physical connection between the local bridge port 12-1 and the remote bridge port 19-1 are indicated at 18-1 in FIG. 1. Other groups or sets of logical connection are indicated with reference numerals 18-2~18-n in a corresponding way.

In this manner, a first data segment can be transmitted from a first one 12-1 of said ports 12 via a set of logical connections 18-1. The first data segment is transmitted as plural network packets, each network packet being transmitted over a different one of the set 18-1 of logical connections. The size of each network packet is set by the value of the RWS parameter for the respective logical connection. The size of the RWS parameter for a logical connection may differ for other logical connections within the same physical network path. The first series of TCP/IP network packets are typically relatively small.

Each network packet includes some of the data segment stored in the data cache 706. The data segment is split into multiple network packets, and each network packet includes a different part of the data segment. Instead of delaying any further transmission until an acknowledgement for the first network packet is received, further network packets are transmitted using the other logical connections of the physical network path. In this manner, the rate at which data is transferred need not be limited by the round trip time between the bridges 3, 4.

In detail, a first network packet is formed from the data segment and is sent over a first one of the logical connections on the physical network path. A second network packet is then formed from the data segment and is sent over a second logical connection on the same physical network path. This continues until all of the data segment has been transmitted, with different parts of the data segment having been transmitted on different logical connections on the same physical network path.

When multiple ports 12 (multiple physical network paths) are used to transmit data between bridges 3, 4, multiple logical connections 18 are associated with each port. The number of logical connections provided with a given port 12 (physical network path) depends on the physical path capability and the round trip time for that physical network path 703,703. Different data segments are transmitted on different physical network paths. Data segments are transmitted in the different physical network paths in parallel with and independently from the data segments transmitted on other physical network paths. Each data segment is transmitted as plural network packets each on a different logical connection on the physical network path used to transmit the data segment.

As previously described, the cache 706 draws data from the data source. This data is subdivided by the dispatcher 704, into blocks of data (data segments) which are referenced by a series of IO vectors—one IO vector for one data segment. These data segments are in turn are passed to the transmitters 707, 711 for transmission to the remote bridge 4. These data blocks are referred to in this specification as data segments.

Each data segment is then subdivided into individual network packets, each of whose size is governed by the individual RWS of each of the logical connection 18 used to transmit the network packet. This is achieved in the following way. The first logical connection uses the IO vector start address value as its start value and removes the amount of data from the "vector stack" equal to its current RWS— header size value. It modifies the start vector address by this amount and passes control to the next logical connection. This process then continues until either the start vector address equal the vector end address or the last logical connection has been used. If the last logical connection has been used, one or more further connections are created to transmit the remaining data of the data segment.

Each network packet is provided with a TCP/IP header by the protocol handler (not shown) that forms part of the transmitters 707, 711. Any header that may form part of the data constituting the data segment is included within the payload of the TCP/IP network packets. Each network packet also includes a second header, which contains two header fields: Sequence number+Nexus ID. The Nexus ID is a unique number that identifies the relationship formed between the initiator (server) and the target device (storage device). The Nexus ID could instead identify a relationship between a source IP address (server) and a sink IP address (client), i.e. a "here to there" relationship.

A method of transmitting data will now be described with reference to FIG. 4. This method involves optimising the number of logical connections used to transfer data over the path 5, 702, 703.

Here, the operation starts at step S1.

At step S2, the IO vector values for the data segment is passed to the transmit buffer 14, which is shown in FIG. 2, ready for transmission. The data segment has a size equal to the value of NTS for the path 702, 703. The data segments are not the packets placed on the physical network by TCP/IP. The size of the data segments are not equal to or otherwise set by the RWS parameter of a given TCP/IP connection. Instead, a data segments is broken into smaller parts and transmitted over the multiple logical TCP/IP connections.

At step S3, the IO vector start address and the length of the data segment is passed to the transmitter interface 707,709 which then calculates the end address value.

At step S4, it is determined whether a logical connection 18 is available. This determination is carried out by examining each of the logical connections 18 that have previously been created and have not been destroyed, and determining whether a logical connection exists but is not currently utilised in sending some of the data that was moved to the buffer at step S2.

As will be appreciated, there is a plural-to-one relationship between logical connections 18 and ports 12. In TCP embodiments, an available logical connection 18 is an established TCP connection between bridges 3, 4 that is not processing data for transmission and has no outstanding acknowledgments.

If no logical connections 18 are available, a new logical connection 18 is created at step S5 by establishing a TCP Stream socket between the bridges 3, 4.

If a logical connection 18 was determined to be available at step S4 or after the creation of a new logical connection 18 at step S5, network packet n is transmitted on the logical connection 18 at step S6. The size of the network packet is equal to the value of the RWS size parameter for that logical connection. The sizes of adjacent network packets in the sequence may differ, according to differences in the value of RWS for different logical connections.

Following step S6, n is incremented at step S7. Following step S7, it is determined at step S8 whether the data moved to the buffer in step S2 constitutes the end of the data to be transmitted. If there is more data in the transmit buffer to be transmitted, step S8 results in a positive determination. If there is more data to be transmitted, step S8 provides a negative determination, and the operation returns to step S4.

Once the end of the data is determined to have been reached, at step S9 network packets are retransmitted as needed. A network packet is determined to require retransmission if an ACK has not been received for that packet and if a timeout for that network packet has expired. The value of the timer used in the timeout determination at step S10 may take any suitable value. For a high latency path between the bridges 3 and 4, the value of the timeout may be relatively high. Multiple attempts may be needed to transmit a network payment before an ACK is received for it. Only once ACKs for all of the network packets have been received does the operation progress to step S10.

In other embodiments, those TCP/IP logical connections that have not received a TCP/IP acknowledgement can be marked as recovery/retransmitting connections and allowed to continue without participating in any further transmission of data segments until completed. This allows for the further transmission of data segments to continue across the remaining logical connections whilst the recovering logical connections continue autonomously. Once the recovering logical connections have completed the recovery/retransmission process, they are once again included within the logical connections participating in the transmission of new data segments. In these embodiments, a new data segment is begun to be transmitted over logical connections for which acknowledgements have been received. As such, parts of two data segments may be transmitted at the same time (in the sense that acknowledgements are awaited for network packets of two data segments) using different logical connections of the physical network path.

At step S10, excess logical connections are destroyed. This may involve destroying all logical connections that have not been utilised to transmit the data moved to the buffer at step S2. Alternatively, only some of the excess logical connections may be destroyed.

To determine excess logical connections, each is first verified to ensure that no data transmissions are in progress and no acknowledgements are outstanding. Excess logical connections are destroyed in a controlled manner. This occurs by the sending of a FIN message from the bridge 3 to the remote bridge 4, which responds by sending an ACK message to the bridge 3 acknowledging the FIN message. The FIN message is in respect of the excess logical connection. The FIN message indicates that there is no more data to be transmitted from the sender. Receipt of the ACK message at the local bridge 3 completes the operation.

In the case of the first path 702, the first path transmitter interface 707 is responsible for the creation and destruction of logical connections, and is configured to so create and destroy. In association with the second path 703, the second path transmitter interface 711 is responsible for, and is configured to perform, the creation and destruction of logical connections. Of course, the first and second path receiver interfaces 708, 712 are active in the creation and destruction of logical connections, although initiation is performed by the first and second path transmitter interfaces 707, 711.

Following step S10, the operation returns to step S3. Here, the next data segment IO vector start address and length are moved to the buffer, ready for transmission of the data segment.

It will be understood from the above that, whilst the data segment has not been transmitted in full, the number of logical connections 18 is managed such that the correct number of logical connections 18 are available to send the data. However, this is achieved without maintaining an unnecessarily high number of logical connections 18. In particular, it is checked regularly (in particular once for each data segment) whether there are excess logical connections 18, and any excess connections detected are then destroyed.

Instead of destroying all the excess connections in one operation, only some of the excess connections detected may be removed at a time. For instance, one excess connection or two excess connections may be removed each time the operation performs the step S10 and determines that there is one or more (or two or more, respectively) excess connections that can be destroyed. Alternatively a proportion (for instance one third) of the excess connections may be removed. Destroying some but not all of the excess connections can result in a number of (one or more) spare logical connections being held in reserve for use should the transmitter 707, 711 require them in response to a change in the conditions of the path 5, 702, 703. Because the time and compute resource required to create a logical connection is greater than to destroy a logical connection, destroying the excess logical connections one at a time may utilise fewer system resources.

However, for a path 5, 702, 703 that is in a relatively steady condition and where data flow into the local bridge 3 is relatively steady, the number of logical connections that are in existence changes relatively infrequently. If the path 5, 702, 703 remains stable, then the number of logical connections decreases to the optimum level whichever of the options for destroying excess logical connections is used.

A consequence of the so far described aspects of the operation of FIG. 4 is that the number of logical connections 18 that are in existence at any given time is optimal or near optimal for the path 5. In particular, the number of logical connections 18 is sufficiently high to allow transmission of all of the data segment without reusing logical connections but is no higher than is needed for this, or at least (all or some of any) excess logical connections 18 are destroyed frequently so as to avoid the number of logical connections 18 being higher than needed for a significant proportion of overall time. This provides optimal performance for the transfer of data over the path 5, 702, 703 but without using memory etc. resources on logical connections that are not needed.

Operation of the dispatcher 704 in the system of FIG. 3, which includes two paths 702, 703, will now be described with reference to FIG. 5.

The operation starts at step S1. At step S2, it is determined by the dispatcher 704 whether there is data in the buffer and indicated by the cache 706 as being required to be transmitted. On a negative determination, at step S3 the dispatcher 706 waits for data to be added to the cache 706. Once data for transmission is determined to be in the input buffer under management of the cache 706, the operation progresses to step S4.

At step S4, the dispatcher 704 detects the one of the paths 702, 703 that has the greatest need for data. This can be achieved in any suitable way.

For instance, the dispatcher 704 may use information supplied by the first and second path transmit AI modules 709 and 713 to determine the path that has the greatest need for data. In particular, the dispatcher 704 may determine based on information supplied by the first and second path AI transmitter modules 709, 713 which of the paths 702 and 703 has the greatest need for data. This requires the AI modules 709, 713 to be configured to calculate and provide relevant information.

In providing information to assist the dispatcher 704 to determine which of the paths 702, 703 has the greatest need for data, the AI transmitter modules 709, 713 perform a number of calculations. In particular, the AI transmitter modules 709, 713 calculate some transmission parameters including packet loss, latency and current performance (in terms of bytes per second). Packet loss is calculated by counting network packets for which acknowledgements were not received (within a timeout window) within a given time period, and calculating the ratio of lost network packets to successfully transmitted network packets. The latency is calculated by calculating the average time between a network packet being transmitted and the acknowledgement for that network packet being received, using timing information provided by the transmit interfaces 707, 711. Speed of the physical path, 702,703 is determined by determining the quantity of data that is successfully transmitted in a time window, of for instance 1 second. Times for which there was no data (no network packets) to transmit may be excluded from the path speed calculation, so the measured path speed relates only to times when data was being transmitted.

On the basis of these measured parameters, the AI transmitter modules 709, 713 calculate, for their respective path 702, 703, a number of bytes that are required to be put onto the path per unit time (e.g. per second). This is calculated by multiplying the measured bandwidth in MB/s of the physical path by the current latency value in seconds.

At a particular moment in time, the AI transmitter modules 709, 713 are able to determine the quantity of data (in bytes) that has been sent but for which acknowledgements have not yet been received. This data can be termed data that is in flight. Data that is in flight must remain in the transmit buffer, as managed by the logical connection, but once an acknowledgement for the data is received then the corresponding memory for the transmit buffer can be reallocated.

Either the AI transmitter modules 709, 713 can report quantity of data in flight to the dispatcher 704 at predetermined times, or in response to trigger events (such as the last byte of data having been transmitted), or else the dispatcher 704 can request that the AI transmitter modules 709, 713 provide quantity of data in flight information. In either case, the dispatcher 704 is provided with quantity of data in flight information from the AI transmitter modules 709, 713 at times when this information is needed by the dispatcher in order to make an assessment as to which path 702, 703 has the greatest need for data. The same applies to path speed information, as calculated by the AI transmitter modules 709, 713.

For each path, the dispatcher 704 calculates a path satisfaction value. For instance, this can be calculated by dividing the amount of data in flight (e.g. in bytes) by the measured path speed. Where the latency of the path is less than 1 second and where the measured path speed measurement has a unit of bytes per second, the path satisfaction value for a path has a value between 0 and 100. A low value indicates that the path is not highly satisfied, and has a relatively high need for data. A high value indicates that the path is relatively highly satisfied, and has a relatively low need for data.

The identification of the path with the greatest need for data is made using the path satisfaction values for the paths. This may involve simply identifying which path has the lowest path satisfaction value, and selecting that path as the path with the greatest need for data. Alternatively, the identification of the path with the greatest need for data may additionally utilise other information such as path speed or latency measured for the path 702, 703.

Once a path 702, 703 has been determined at step S4, the dispatcher 704 begins preparing to provide the transmit interface 707, 711 for the path 702, 703 with data from the data cache 706. This starts at step S5, where the value of the NTS parameter for the path 702, 703 is fetched. The value of the parameter is fetched from the corresponding path's AI transmitter module 709, 713. The value of the NTS parameter is calculated by the AI transmitter module 709, 713 in the manner described below with reference to FIG. 7. Since the value of the NTS parameter is calculated separately for each of the paths 702, 703, there may be (and typically is) a different NTS parameter for each of the paths 702, 703.

At step S6, the dispatcher 704 selects some data from the cache 706 to form data segment for the selected path. The amount of data selected has a length equal to the fetched value of the NTS parameter. It will be appreciated that the data stored in the cache includes data and commands, and that both may be selected to be included in the data segment.

Once a quantity of data from the dispatcher 704 has been selected for provision to the path as a data segment, an IO vector for the selected data is created by the dispatcher 704, for use by the transmit interface 707, 711 of the selected path. The creation of the IO vector constitutes the creation of a data segment. Briefly, the conversion of the IO vector results in an IO vector that points to a data segment having the same size as the size indicated by the NTS parameter for the path which was fetched at step S5. The IO vector is later provided to the transmit buffer (not shown) associated with the relevant path 702, 703. In more detail, the IO vector is created with a start memory address (pointer). The vector has a length field including a length parameter, which indicates the size of the data segment. When the preceding IO vector or data segment for the same path 702, 703 has been transmitted, the next IO vector i is provided to the FIFO buffer in the relevant transmit interface 707, 711. The IO vector then constitutes a data segment, although the physical data remains in its original location (i.e. the location prior to processing by the dispatcher 704) in the buffer.

In particular, the IO vector is transferred to the selected path 702, 703, and in particular to a FIFO buffer (not shown) of the transmit interface 707, 711 of that path. The result is the provision at a future time, to the FIFO buffer (not shown) forming part of the transmit interface 707, 711 of the path that was detected at step S4 to have the greatest need for data, of an IO vector comprising a pointer to a data segment and indicating the length of the data segment. Moreover, the FIFO buffer of the path 702, 703 is provided with an IO vector that relates to a data segment having the optimum size. This allows the path 702, 703, and in particular the relevant transmit interface 707, 711, to access the data from the cache 706. This is provided in a data segment having the optimum network transfer size (NTS) that has been determined for the selected path, for transmission over multiple one of the logical connections 18-1 of the selected path 702, 703.

After step S6, the operation returns to steps S2. If there is no more data in the cache 706, the operation loops to wait at step S3. This continues until there is more data in the cache 706, when the operation progresses again to step S4. Here, the steps S4 to S6 are performed again for the next part of the data in the cache 706. This is repeated until all of the data in the cache 706 has been formed into an IO vectors.

If when performing step S4 there is at least one IO vector that has been formed but which has not yet been moved to the transmit buffer in the transmit interface 707, 711, performance of step S4 is slightly different. In particular, the selection of a path is based on a prediction as to which path 702, 703 will have the greatest need for data at the time when the IO vector becomes the first vector in the queue to be transmitted. This may occur in any suitable way, for instance using the measures discussed above in relation to the first performance of step S4.

If step S4 identifies that the same path 702, 703 still has the greatest need for data, an IO vector (and thus data segment) is created with a length equal to the value of the NTS value for that path 702, 703. The value of NTS does not normally change between successive data segments for the same path 702, 703, although this does occur occasionally.

When step S4 identifies that the opposite path 702, 703 has the greatest need for data, an IO vector (and data segment) is created with a length equal to the value of the NTS value for that opposite path 702, 703. The size of this next data segment is dependent on the value of a different NTS parameter (the NTS parameter for the opposite path) so often is different to the size of the previous data segment.

Figure 5:
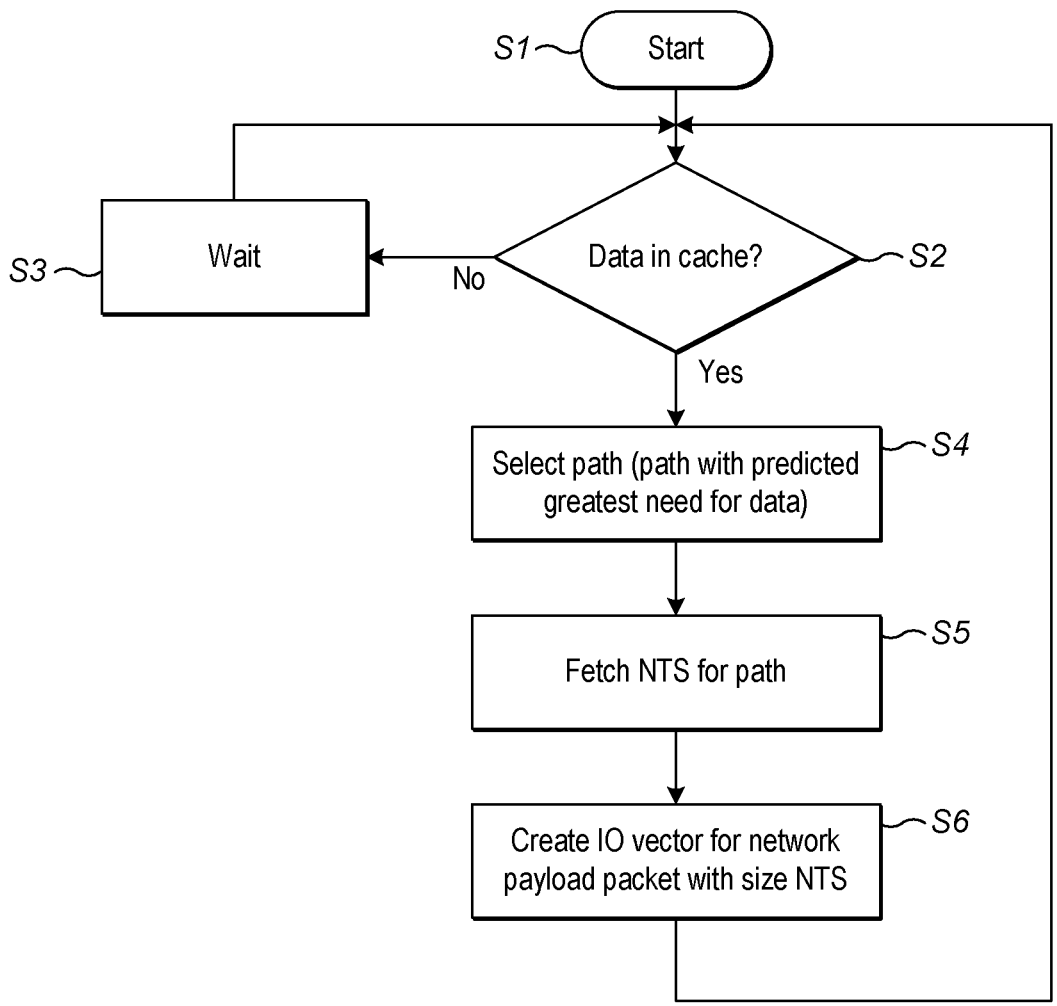
FIG. 5 is a flowchart illustrating a method of calculating a data segment size parameter according to embodiments of the present specification.

The result of the operation on the FIG. 5 flowchart is the conversion of all the data cache elements in the cache 706 into IO vectors for transmission as a data segment by the transmit modules 707, 711. Moreover, the IO vectors are sized so as to optimise performance over the path for which the vectors are to be transmitted. Ordinarily the sequence of IO vectors is formed such that the corresponding data segments are transmitted in the order in which the data was received at the cache 706. However, there may be small deviations from this order. Additionally, the dispatcher 704 may be configured so as to provide a minimum number of (for instance 2) sequential IO vectors for a given path 702, 703 when that path is determined at step S4 as being the path with the greatest need for data.

For a data cache element that is longer than the value of the NTS parameter that is fetched at step S5 when the data segment is first processed, the transmission of the data cache element may occur over two different paths 702, 703. It is not that the same data cache element is transmitted over both paths. Instead, different parts of the data cache element are transmitted over different paths 702, 703.

Figure 6:
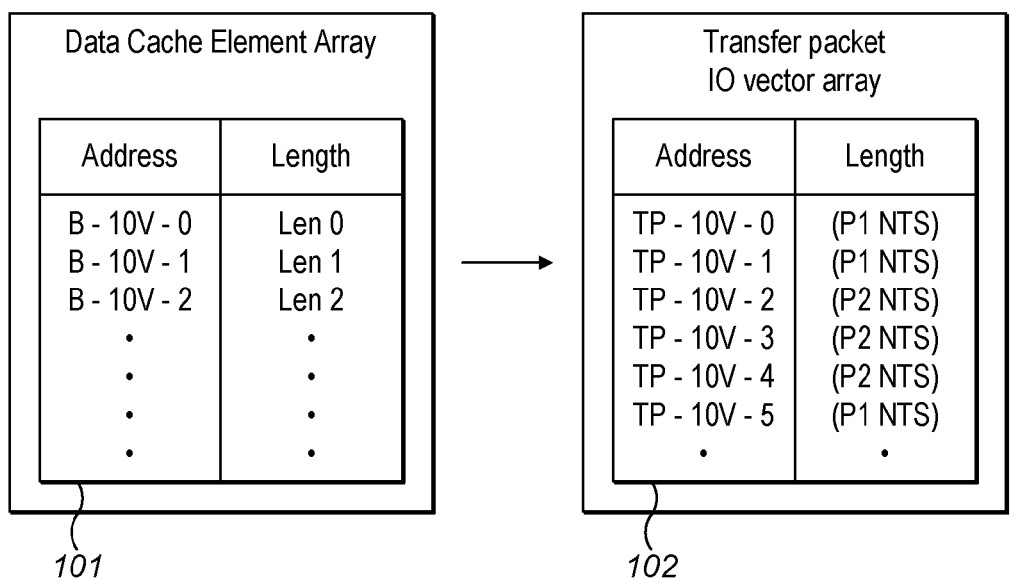
FIG. 6 shows IO vector arrays handled by a transmitter according to embodiments of the specification.

Referring now to FIG. 6, an IO vector array 101 for the data cache elements stored the cache 706 is shown on the left side of the Figure and an IO vector array 102 for the data segments is shown on the right side of the Figure. The data segment IO vector array 101 of the buffer is managed by the dispatcher 704.

The conversion of the IO vector arrays described above results in the sending of at least some data segments having a desired length (equal to the value of the NTS parameter) without requiring the unnecessary copying of data. This is achieved because the IO vectors in the data segment IO vector array 102 include address and length information that directly relates to the data segments. Thus, the number of memory read and write operations is minimised, whilst at the same time allowing high flexibility in the receiving of input data into the local bridge 3 and the sending of data segments of a desired length to the remote bridge 4. Of course, some data segments may be created with a length that is less than the value of the NTS parameter, in particular when there is no more data in the cache 706.

To optimise the flow of data across the paths 702, 703, the IO vector size for each transmit interface should equal the sum of the RWS parameters of the active logical connections. Any IO vector size larger than this would require a number of logical connections to be used more than once before the IO vector could be released and another one loaded. This would leave active logical connections without data to transmit and thus would result in inefficiency and a loss of performance as there would be a delay before loading the new IO vector data. In a similar manner, an IO vector size that is too small would have a similar but lesser effect.

Those persons familiar with the workings of TCP/IP protocol will understand that each of the multiple logical connections 18 that are on a given physical network path and are used simultaneously to transfer data between bridges 3, 4 could have a different value for the RWS parameter from another and this may change as the data transfers progress over time. The value of the RWS parameter for a logical connection is determined by the receiver 4 based on packet loss, system limitations including available memory, a ramp up size setting and a maximum RWS size setting. In TCP/IP, the value of the RWS parameter is set by the TCP/IP protocol handler and is not able to be controlled by the transmitter modules 707, 711 based on any other factors other than those set by the TCP/IP protocol. In addition, depending on the network conditions detected by the AI modules 707, 711, the number of logical connection may also vary in a response to changes in latency or any other network event.

Whilst it may be possible to calculate the perfect size for a data segment at a given moment in time by determining instantaneous RWS parameters for all the logical connections on a path and summing them, this would require considerable processing resources and a considerable amount of signalling where the number of logical connections is relatively high. Also, while it might be sufficient in a stable environment such as a Local Area Network (LAN) this method would become unreliable in an every changing environment such as a Wide Area Network (WAN) across multiple physical paths with changing latency, packet loss, and congestion. Embodiments of the present specification provide a better solution to the question of how to determine data segment size.

Figure 7:
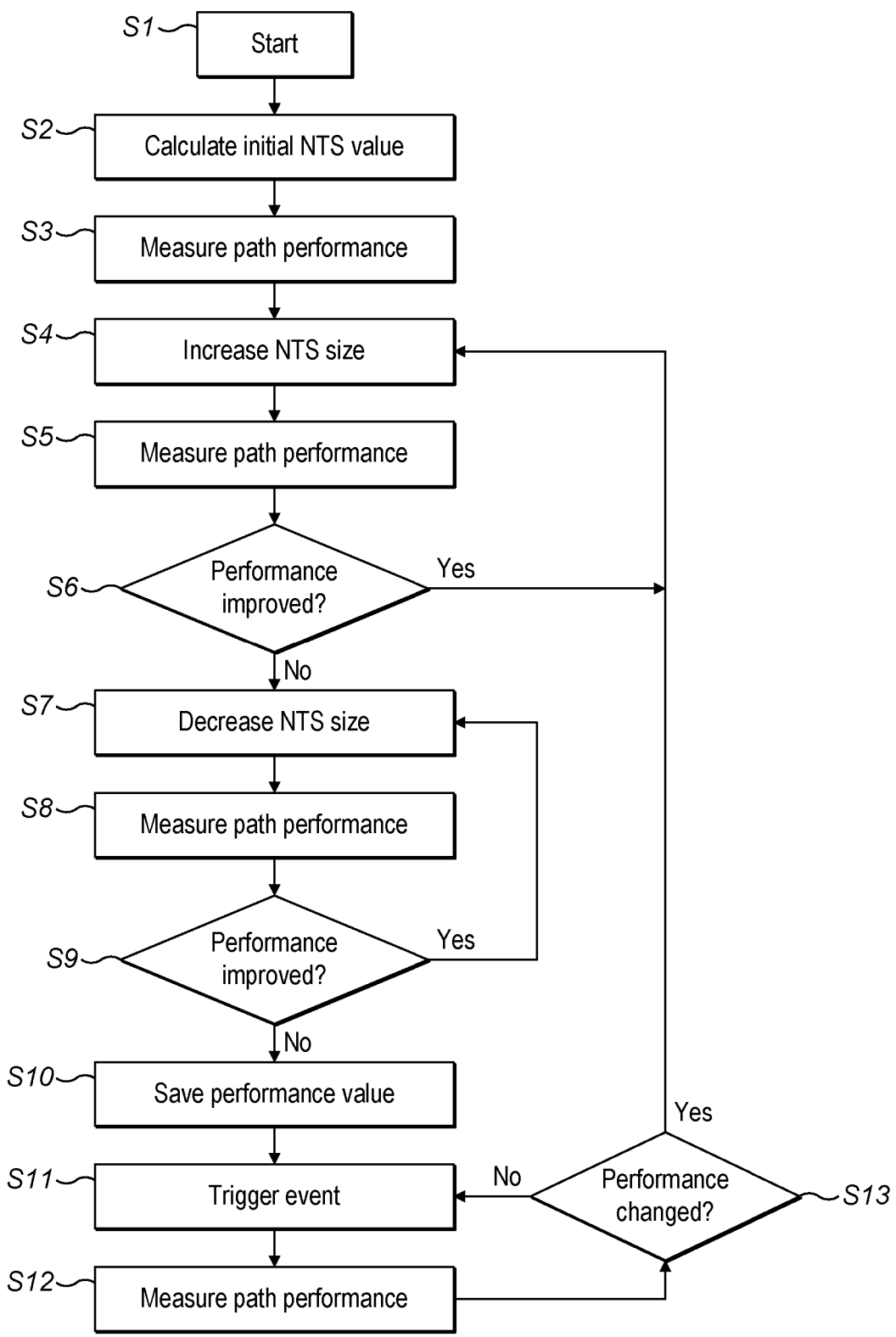
FIG. 7 is a flowchart illustrating a method of varying an NTS parameter used in creating vectors according to embodiments of the present specification.

The calculation of the optimum network transfer size (NTS) parameter, as used in the FIG. 5 flowchart, will now be described with reference to FIG. 7. The operation of FIG. 7 is performed by the transmit artificial intelligence (AI) modules 709, 713 in the local bridge 3. The operation of FIG. 7 is performed by each transmit AI module 709, 713. Additionally, it is performed by each transmit AI module 709, 713 independently of the other transmit AI module 709, 713. Each transmit interface 707, 711 is connected to a different path 702, 703, and different NTS parameters might be calculated for the different paths at a given time.

The operation starts at step S1. At step S2, the initial NTS is calculated by using a representative sample TCP receive window size (RWS) from a logical connect related to the path 702, 703 in question. This is obtained in the usual way, together with the number of active logical connections.

At step S3, the performance of the path is measured. This involves the transmission of network packets by the transmit interface 707, 711 using the initial value of NTS set in step S2. Transmission is allowed to be performed for a period of time before performance is measured, so as to allow the path 702, 703 to stabilise. The path may need time to stabilise because intermediate devices (not shown) within the path 702, 703 and other factors affect initial stability. After allowing some time for the path 702, 703 to stabilise, the performance of the path is measured and this value becomes the current performance level.

Performance is measured here in terms of throughput, for instance in bytes per second. Performance is measured over a predetermined period of time or quantity of data transferred, or both. The predetermined quantity of data may be in terms of bytes, or network packets. Time may be in terms of seconds or minutes.

The value of the TCP RWS parameter on each logical connection will change occasionally, and the frequency of change depends on the stability of the physical network path(s). A function within the TCP protocol tries to increase the value of the TCP RWS parameter as part of its own program to improve the efficiency of the data transfer process. However, if a transmitter operating according to the TCP protocol encounters lost packets or timeouts in transmissions, it reduces the value of the TCP RWS parameter to a significant extent, usually by a very large degree. This contributes to improving the reliability of the transmission process. Therefore it is important to the overall efficiency of the transfers between the bridges 3, 4 that the size of the data segments passed for transmission under the TCP protocol is optimised for the path as a whole and not the value of the individual TCP/IP RWS parameters of the logical connections. The value of the Network Transfer Size (NTS) parameter also changes depending on the conditions and stability of the path 702, 703. Typically, the values of the NTS parameters for the paths 702, 703 does not change for every data segment, but might change on average some tens, hundreds or thousands of data segments, depending on how often there are relevant changes detected on the physical path.

Following step S3, at step S4 the value of NTS value is increased. The increase may be by a fixed amount, percentage or a division of the current transfer size, or it may be by a dynamic amount dependent on the measured performance. For instance, in a situation in which the value of the NTS parameter is 1 MB, the value of the NTS parameter may be reduced by 100 KB, 25 percent or NTS/2 (so, 512 KB). In another situation as the measured performance nears the maximum performance of the path, the magnitude of the change reduces in each iteration to prevent over- and undershoots in performance.

At step S5, the transmit interface 707, 711 in the local bridge 3 then sends data segments using the increased NTS value, and the performance of the path with the increase NTS value is measured at step S4. Performance measurement is completed in the same way as described above with reference to step S3 and over the same time period or quantity of data. The commencement of measurement of performance of the path may be delayed to allow some time for the path 702, 703 to stabilise.

After the performance has been measured, it is determined at step S6 whether the performance has improved. The performance will be determined to have improved if the measured performance at step S6 is greater than the performance measured at the previous instance of measurement. If it is determined that performance has improved, the operation returns to step S4, where the value of NTS is again increased.

The sequence S4, S5, S6 is repeated until the path performance level decreases or remains constant. At this point the sequence moves on to step S7.

Once it is determined at step S6 that performance has not improved, at step S7 the value of the NTS parameter is decreased. The amount of the decrease may be fixed and predetermined, or it may be dynamic dependent on the change in performance detected.

At step S7, the NTS parameter is decreased and the path performance value is measured at step S8.

After the performance has been measured, it is determined at step S9 whether the performance has improved. The performance will be determined to have improved if the measured performance at step S8 is greater than the performance measured at the previous instance of measurement. If it is determined that performance has improved, the operation returns to step S7, where the value of NTS is again decreased.

The performance is determined not to have improved if the measured performance at step S9 is less than or the same as the performance measured at the previous instance of measurement. If the performance is determined not to have improved, the operation progresses to step S10. Here, the current performance value is saved. After this, the operation continues on to step the S11 where the operation waits for a parameter change or period event to occur.

It will be appreciated that steps S4 to S10 need not be performed every time that a data segment is transmitted. Instead, these steps may be performed periodically, in terms of at fixed time intervals or in terms of a fixed number of data segments. These are classed as period event or trigger. Alternatively, they may be performed only if it is determined that the value of the sampled TCP RWS parameter has changed, as may occur when there is a change with the physical path such as a change in the packet loss rate, changes in round trip times (latency), packet time out parameter values, path drops, etc. Such events are classed as parameter change events or triggers.

When such a trigger event occurs, the operation proceeds to S12 where it measures the path performance. At step S13, it is determined whether the performance has changed. If no discernible change is detected, the operation returns to step S11 and waits for another event. If a measurable change in the path performance was detected at step S13, then the operation returns to step S4 and the procedure is repeated.

The action of decreasing the NTS value at step S7 to a point where the performance decreases is deliberate and is used to provide an amount of performance headroom to the path. If a path is working at its maximum performance and experiences packet loss due to congestion, the RWS of the logical connections will reduce and a number of packets that were lost will have to be retransmitted. Leaving performance headroom on the path reduces the possible effect of packet loss and the subsequent retransmission. This therefore maintains the performance of the path if the path becomes congested due to packets from other sources or the network infrastructure (such as a switch) becoming blocked. For example if the value of the NTS parameter is set such the performance of the path 702, 703 is set 5% below the maximum possible, the path 702,703 could sustain a 5% additional traffic on the path from another source without congestion resulting in packet loss.

Broadly, the AI 702 starts with a rough calculation of the RWS as a start point of the data size (NTS). This is demanded from the dispatcher 704. As the data is presented to the data buffer within 702 and is transmitted by each connection. If there is data remaining the buffer then extra connection(s) are created and the data is transmitted. As the process continues around the flow chart in FIG. 7, the size of the data packet continues to increase until the performance falls or remains the same. It then decreases the data block size (NTS) until the performance increases or falls. By measuring the actual performance rather than theoretical performance, if packet loss is experienced, the RWS will shrink and the performance will decrease. Initially the data size will remain the same and the extra connections required will be created automatically by the process. If the performance remains the same then no further action is required. If the performance decreases then the first action would be to increase the packet size until there is no further increase in performance. As the network connection gain stability then the RWS will increase and the extra connections will be destroyed automatically to preserve resources. As the data block size does not increase then performance will remains the same and should not overdrive the path creating packet loss.

Figure 8:
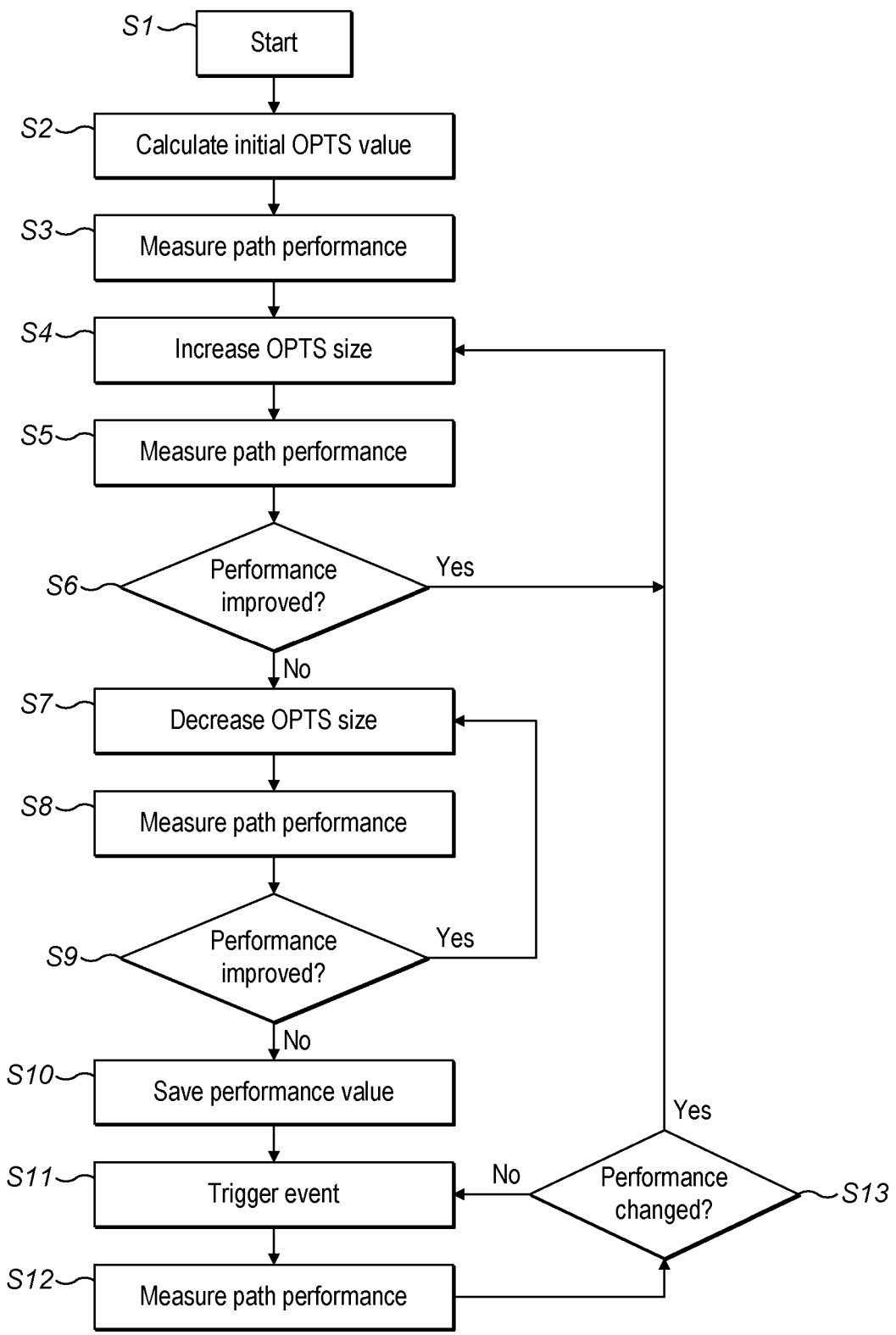
FIG. 8 is a flowchart illustrating calculating an OPTS value used in operating a system according to embodiments of the present specification.

The calculation of a value for the optimum transfer size (OTS) parameter, as used in calculating the quantity (size) of data that is requested from a host when the cache 706 has capacity to receive more data, will now be described with reference to FIG. 8. The operation of FIG. 8 is performed by the dispatcher 704 in the local bridge 3.

As previously mentioned, the goal of the OTS parameter is to maintain a steady flow of data to the bridge 3, and subsequently to the physical network paths 702, 703, 5. If too little data is requested each time, then the cache 706 empties too quickly and there is a lack for data to transmit. This would cause the data flow across the network to halt. If too much data is requested then there is a possibility of the data and commands in the cache timing-out before the dispatcher 704 has the opportunity to pass it on to the transmission modules 707, 711.

The operation starts at step S1. At step S2, the initial value of the OTS parameter is derived. The initial OTS parameter is calculated from the first transfer request from the data source. An example of a transfer request is a SCSI (Small Computer Serial Interface) write transfer command. Within the structure of the command is data from which it is possible to determine the length of the data transfer Data is transferred over the paths 702, 703 using the initial value of the OTS parameter.

At step S3, the performance of the path is measured. This involves the transmission of data segments by the transmit interfaces 707, 711 using the initial value of OTS set in step S2. At this time, the value of NTS is caused to remain unchanged. Transmission is allowed to be performed for a period of time before performance is measured, so as to allow the paths 702, 703 to stabilise. The paths may need time to stabilise because intermediate devices (not shown) within the path 702, 703 and other factors affect initial stability. After allowing some time for the paths 702, 703 to stabilise, the overall performance of the paths is measured and this value becomes the current performance level. Performance is measured across all paths in total, so if there are multiple paths the performance is the sum of the performance measures of the individual paths.

Performance is measured here in terms of throughput, for instance in bytes per second. Performance is measured over a predetermined period of time or quantity of data transferred, or both. The predetermined quantity of data may be in terms of bytes, or network packets. Time may be in terms of seconds or minutes.

Following step S3, at step S4 the value of OTS value is increased. The increase may be by a fixed amount, percentage or a division of the current transfer size, or it may be by a dynamic amount dependent on the measured performance. For instance, in a situation in which the value of the OTS parameter is 100 MB, the value of the NTS parameter may be reduced by 10 MB, 25 percent or OTS/5 (so, 20 MB). In another situation as the measured performance nears the maximum performance of the path, the magnitude of the change reduces in each iteration to prevent over- and undershoots in performance.

At step S5, the transmit interfaces 707, 711 in the local bridge 3 send data segments using the increased OTS value, and the performance of the paths with the increase OTS value is measured at step S4. Performance measurement is completed in the same way as described above with reference to step S3 and over the same time period or quantity of data.

After the performance has been measured, it is determined at step S6 whether the performance has improved. The performance will be determined to have improved if the measured performance at step S6 is greater than the performance measured at the previous instance of measurement. If it is determined that performance has improved, the operation returns to step S4, where the value of OTS is again increased.

The sequence S4, S5, S6 is repeated until the path performance level decreases or remains constant. At this point the sequence moves on to step S7.

Once it is determined at step S6 that performance has not improved, at step S7 the value of the OTS parameter is decreased. The amount of the decrease may be fixed and predetermined, or it may be dynamic dependent on the change in performance detected.

At step S7, the OTS parameter is decreased and the path performance value is measured at step S8.

After the performance has been measured, it is determined at step S9 whether the performance has improved. The performance will be determined to have improved if the measured performance at step S8 is greater than the performance measured at the previous instance of measurement. If it is determined that performance has improved, the operation returns to step S7, where the value of OTS is again decreased.

The performance is determined not to have improved if the measured performance at step S9 is less than or the same as the performance measured at the previous instance of measurement. If the performance is determined not to have improved, the operation progresses to step S10. Here, the current performance value is saved. After this, the operation continues on to step the S11 where the operation waits for a parameter change or period event to occur.

Steps S4 to S10 may be performed periodically, in terms of at fixed time intervals or in terms of a fixed number of data segments transferred. These are classed as period events or triggers. Alternatively, they may be performed only if it is determined that the value of a sampled TCP RWS parameter has changed, as may occur when there is a change with the physical path such as a change in the packet loss rate, changes in round trip times, packet time out parameter values, path drops, etc. Such events are classed as parameter change events or triggers. Other parameter change events or triggers that cause recommencing the performance of steps S4 to S10 include: the average path satisfaction value falling below a threshold value (e.g. 75%), a new optimum value of the NTS parameter being determined, the level of data in the input data cache falling below a threshold or watermark, or the number of logical connections awaiting acknowledgements exceeding a threshold number or proportion of total logical connections.

When such an event occurs, the operation proceeds to S12 where it measures the path performance. At step S13, it is determined whether the performance has changed. If no discernible change is detected, the operation returns to step S11 and waits for another event. If a measurable change in the path performance was detected at step S13, then the operation returns to step S4 and the procedure is repeated.

The action of decreasing the OTS value at step S7 to a point where the performance decreases is deliberate and is used to provide (in a similar manner to the varying of the NTS parameter) an amount of performance headroom to the path. This performance headroom helps to allow for packet loss if another device increases the amount of data it is sending over the same on the physical network that it shares with the bridges 3, 4.

It will be appreciated that the operation of FIG. 7 results in the measurement of performance of the transmission of data over the path 5 having regard to a particular OTS size, changing the value of OTS in one direction (either increasing it or decreasing it) until the performance is determined not to be improved, and then changing the value of OTS in the other direction (i.e. decreasing it or increasing it respectively).

The actions controlling the number of logical connections and the values of the NTS and OTS parameters all interact with each other. The AI modules 709, 713 control simultaneously both the value of the NTS parameter and the number of logical connections. This occurs in a system with critical dampening with more than one process to control. Each process causes an "overall" overshoot and then undershoot decreasing each time until it hits a steady state. A similar process happens when the process of varying the value of the NTS parameter and the number of logical connections interacts to find the optimum value of the OTS parameter.

As mentioned above, each of the paths 702, 703 includes multiple logical software-created connections. Each of the paths 702, 703 has one physical port. These ports and logical connections may be provided as described above with reference to FIGS. 1, 2, 3 and 4. The number of logical connections is selected so as to provide suitable performance of data transfer over the respective path, 702, 703. In the case of the method of FIG. 4, the number of logical connections is managed so as to optimise instant performance, or to near optimise instant performance whilst providing some headroom to accommodate a change in path performance without needing to create logical connections frequently.

The first path transmitter AI module 709 performs the optimum network transfer size (NTS) calculation that is described above in reference to FIG. 7. As such, the first path transmitter AI module 709 calculates a value for NTS that is optimum having regard to the transmission conditions on the first path 702.

Similarly, the second path transmitter AI module 713 performs the NTS calculation operation of FIG. 7 in order to calculate an NTS value that provides optimum performance of data communication over the second path 703.

As such, each transmitter AI module uses measured performance of its respective path 702, 703 to calculate parameters used to transmit data over its respective path 702, 703.

Each transmitter AI module 709, 713 operates independently. Each transmitter AI module 709, 713 optimises data transmission over its respective path 702, 703 utilising all of the information available to it, including acknowledgements from the first path receive interfaces 708, 712 of the remote bridge 4 etc.

Each transmitter AI module 709, 713 results in (through control of the dispatcher 704) a quantity of data (equating to the value of the NTS parameter) to be taken from the cache 706 by its respective transmit interface 707, 711 according to the demands of the path, as determined by the transmitter AI module 709, 713. This is described in detail above with reference to FIG. 5.

Each transmitter AI module 709, 713 operates independently of the other transmitter AI module 709, 713. As such, each transmitter AI module 709, 713 is unaware of the operation of the other transmitter AI module 709, 713, and is unaware of the data that is transmitted on the path 702, 703 that is not controlled by the other transmitter AI module 709, 713. Moreover, each transmitter AI module 709, 713 operates according to the conditions on its path 702, 703, independently of conditions on the other path.

The use of a distinct transmitter AI module 709, 713 for each path 702, 703 provides a number of advantages.

First, it allows the transmitter AI modules 709, 713 to be simpler, in terms of their construction and operation, than would be the case for a corresponding scenario in which a single transmitter AI module was constructed to optimise data transmission over two separate paths, especially considering the existence of multiple logical connections on the paths. This reduces the hardware requirement of the transmitter AI modules 709, 713 and allows the bridge to scale by the addition of further multiple paths without consuming more resources.

Secondly, it allows each transmitter AI module 709, 713 to be highly responsive to the transmission conditions on its path 702, 703. Such would potentially be very difficult to achieve if a single AI module were used. This advantage is more significant because of the operation of the dispatcher 704 to vector data segments to paths according to the demands of those paths, as is described above.

Thirdly, it allows two very different paths 702, 703 to be used, whereas such may not even be possible, and would certainly be very difficult, to achieve using a single AI module. This can be particularly advantageous in situations where the transfer of larger amounts of data from portable devices, such as laptop computers and tablet computers, is desired. In such situations, the backing up or other transfer of contents of the portable device can utilise two distinct radio communication paths, such as WiFi and 4G cellular, or one such radio communication path and one wired communication path such as USB, Firewire, Thunderbolt, Ethernet etc.

The effectiveness of the operation of the two separate transmitter AI modules 709, 713 is enhanced if each transmitter AI module 709, 713 runs on a different thread, and preferably (although not necessarily) on different processor cores.

The aim of the feedback system is to maintain a constant data flow through all the elements in the system, in order to maximise the data flow between the storage device and the host. The feedback system can send both positive demand requirements, where there is spare capacity in the various elements in the data path, and negative demand requirements, to slow down the rate of data ingress from the host where it detects a that the rate of output data to the storage device is too low having regard to the input data rate from the host.

Although in the above two paths 702, 703 are used for the transmission of data, in other embodiments there are further paths. In these embodiments, each path has a respective transmit interface, a receive interface, a transmit interface, a transmit AI module and a receive AI module.

Except where two or more paths are required, the features that are described above in relation to the FIG. 3 embodiments apply also to the FIG. 1 embodiment. This applies to all features.

The dispatcher 704, the first AI module 709 and the first transmit interface 707 described above are in some embodiments used without the second AI module and the second transmit interface. In these embodiments, only one path 5, 702 is present. However, plural logical connections are used and data segments are created such as to provide optimised transfer of data over the path 5, 702.

The data that forms the data in at the transmitter can take any suitable form. For instance, it may be backup data for recording on a tape or on disk. It may be remote replication data. It may be restore data, being used to restore data from a location where it had been lost. It may alternatively be file-based data from a file transmission protocol (FTP) sender. It may alternatively be stream from a camera, for instance an HTTP camstream. It may alternatively be simple object storage data. This is a non-exhaustive list.

Although the embodiments described above relate to a SAN, the apparatus and method can be used in other applications where data is transferred from one node to another. The apparatus and method can also be implemented in systems that use a protocol in which ACK messages are used to indicate successful data reception other than TCP/IP, such as those using Fibre Channel over Ethernet (FCOE), Internet Small Computer Systems Interface (iSCSI) or Network Attached Storage (NAS) technologies, standard Ethernet traffic or hybrid systems.

In addition, while the above described embodiments relate to systems in which data is acknowledged using ACK messages, the methods may be used in systems based on negative acknowledgement (NACK) messages. In ACK-based embodiments, the processor 10 of the bridge 3 determines whether an ACK message has been received. In NACK-based embodiments, the processor 10 may instead be arranged to determine whether a NACK message has been received during a predetermined period of time and, if not, to continue to data transfer using port i.

The invention claimed is:

1. A method comprising:
    a) initialising a value of a parameter relating to a size of a data segment;
    b) providing a transmit buffer with a first data segment having a size equal to the value of the parameter;
    c) transmitting the first data segment over a path as plural network packets, each network packet being transmitted over a different one of plural logical connections;
    d) moving a second data segment having a size equal to the value of the parameter to the transmit buffer;
    e) transmitting the second data segment over the path as plural network packets, each network packet being transmitted over a different one of the plural logical connections;
    f) performing steps d) and e) for a period of time sufficient to allow the path to stabilise before measuring performance of transmitting data over the path when repeating steps d) and e) for further data segments;
    g) changing the value of the parameter;
    h) measuring performance of transmitting data over the path when repeating steps d) and e) for further data segments with the changed value of the parameter;
    i) using measured performance of transmitting data over the path with different values of the parameter to determine an optimum value for the parameter; and
    j) using the optimum value for the parameter when repeating steps d) and e) for still further data segments.

2. The method as claimed in claim 1, comprising using the optimum value for the parameter when repeating steps d) and e) for still further data segments until a trigger condition is detected, and responding to detecting the trigger condition by performing steps h) and i) to determine a new optimum value for the parameter.

3. The method as claimed in claim 1, comprising performing step i) by determining a value of the parameter that provides maximum performance and setting the optimum value for the parameter as being different to the value of the parameter that provides maximum performance.

4. The method as claimed in claim 1, comprising creating a new logical connection when there is part of a data segment transmitting over the path and there are no logical connections available for transmission.

5. The method as claimed in claim 1, comprising destroying excess logical connections when the further data segments have been fully transmitted.

6. The method as claimed in claim 5, comprising identifying excess logical connections by determining that there are plural logical connections that have not been used in the transmission of the further data segments when the further data segments have been fully transmitted.

7. The method as claimed in claim 1, comprising deleting the first data segment from the transmit buffer and moving the second data segment to the transmit buffer in response to determining that the first data segment has been successfully transmitted.

8. The method as claimed in claim 1, comprising deleting the second data segment from the transmit buffer and moving a third data segment to the transmit buffer in response to determining that the second data segment has been successfully transmitted.

9. The method as claimed in claim 1, comprising moving the second data segment to the transmit buffer and transmitting the second data segment whilst at least one of the plural logical connections of the path is awaiting an acknowledgment of a network packet of the first data segment, and transmitting the second data segment using ones of the plural logical connections for which acknowledgements of network packets of the first data segment are not awaited.

10. The method as claimed in claim 2, wherein the trigger condition comprises a parameter change event.

11. The method as claimed in claim 1, wherein g), h), i) and j) comprise:
    changing the value of the parameter in a first direction until performance is determined not to be improved, then changing the value of the parameter in the opposite direction until performance is determined not to be improved, and then saving the resulting performance value and/or using the resulting performance value until a trigger condition occurs.

12. A method comprising:
   initialising a value of an input transfer size parameter;
   initialising a value of a transfer data segment parameter;
   requesting data from a data source, the requesting using the value of the input transfer size parameter to indicate an amount of data requested;
   storing data received from the data source in a cache;
   using the value of the transfer data segment parameter to form a data segment from data stored in the cache;
   transmitting the data segment using multiple logical connections of a transfer path, each logical connection carrying a different part of the data segment;
   when it is confirmed that the data segment has been transmitted over the transfer path, deleting the data segment from the cache;
   measuring performance of transmission of data over the path using different values of the transfer data segment parameter and identifying a first optimum value of the transfer data segment parameter;
   whilst transmitting using the first optimum value of the transfer data segment parameter, measuring performance of transmission of data over the path using different values of the input transfer size parameter and identifying a first optimum value of the input transfer size parameter;
   whilst transmitting using the first optimum value of the input transfer size parameter, measuring performance of transmission of data over the path using different values of the transfer data segment parameter and identifying a second optimum value of the transfer data segment parameter; and
   requesting data from the data source using the first optimised value of the input transfer size parameter to indicate an amount of data requested and using the value of the second optimum value of the transfer data segment parameter to form data segments from data stored in the cache for transmission over the path.

13. The method as claimed in claim 12, comprising, whilst transmitting using the second optimum value of the transfer data segment parameter, measuring performance of transmission of data over the path using different values of the input transfer size parameter and identifying a second optimum value of the input transfer size parameter.

14. The method as claimed in claim 12, comprising measuring performance of transmission of data over the path using different values of the transfer data segment parameter in response to a first trigger event.

15. The method as claimed in claim 14, wherein the first trigger event comprises a parameter change event.

16. The method as claimed in claim 12, comprising measuring performance of transmission of data over the path using different values of the input transfer size parameter in response to a second trigger event.

17. The method as claimed in claim 16, wherein the second trigger event comprises a parameter change event.

18. The method as claimed in claim 12, wherein identifying an optimum value of a parameter comprises determining a value of the parameter that provides maximum performance and setting the optimum value for the parameter as being different to the value of the parameter that provides maximum performance.

19. Apparatus, the apparatus having at least one processor and at least one memory having computer-readable code stored therein which when executed controls the at least one processor to perform a method comprising:
   a) initialising a value of a parameter relating to a size of a data segment;
   b) providing a transmit buffer with a first data segment having a size equal to the value of the parameter;
   c) transmitting the first data segment over a path as plural network packets, each network packet being transmitted over a different one of plural logical connections;
   d) moving a second data segment having a size equal to the value of the parameter to the transmit buffer;
   e) transmitting the second data segment over the path as plural network packets, each network packet being transmitted over a different one of the plural logical connections;
   f) performing steps d) and e) for a period of time sufficient to allow the path to stabilise before measuring performance of transmitting data over the path when repeating steps d) and e) for further data segments;
   g) changing the value of the parameter;
   h) measuring performance of transmitting data over the path when repeating steps d) and e) for further data segments with the changed value of the parameter;
   i) using measured performance of transmitting data over the path with different values of the parameter to determine an optimum value for the parameter; and
   j) using the optimum value for the parameter when repeating steps d) and e) for still further data segments.

20. A non-transitory computer-readable storage medium having stored thereon computer-readable code, which, when executed by computing apparatus, causes the computing apparatus to perform a method comprising:
   a) initialising a value of a parameter relating to a size of a data segment;
   b) providing a transmit buffer with a first data segment having a size equal to the value of the parameter;
   c) transmitting the first data segment over a path as plural network packets, each network packet being transmitted over a different one of plural logical connections;
   d) moving a second data segment having a size equal to the value of the parameter to the transmit buffer;
   e) transmitting the second data segment over the path as plural network packets, each network packet being transmitted over a different one of the plural logical connections;
   f) performing steps d) and e) for a period of time sufficient to allow the path to stabilise before measuring performance of transmitting data over the path when repeating steps d) and e) for further data segments;
   g) changing the value of the parameter;
   h) measuring performance of transmitting data over the path when repeating steps d) and e) for further data segments with the changed value of the parameter;
   i) using measured performance of transmitting data over the path with different values of the parameter to determine an optimum value for the parameter; and
   j) using the optimum value for the parameter when repeating steps d) and for still further data segments.

21. Apparatus, the apparatus having at least one processor and at least one memory having computer-readable code stored therein which when executed controls the at least one processor to perform a method comprising:
   initialising a value of an input transfer size parameter;
   initialising a value of a transfer data segment parameter;
   requesting data from a data source, the requesting using the value of the input transfer size parameter to indicate an amount of data requested;
   storing data received from the data source in a cache;
   using the value of the transfer data segment parameter to form a data segment from data stored in the cache;

transmitting the data segment using multiple logical connections of a transfer path, each logical connection carrying a different part of the data segment;

when it is confirmed that the data segment has been transmitted over the transfer path, deleting the data segment from the cache;

measuring performance of transmission of data over the path using different values of the transfer data segment parameter and identifying a first optimum value of the transfer data segment parameter;

whilst transmitting using the first optimum value of the transfer data segment parameter, measuring performance of transmission of data over the path using different values of the input transfer size parameter and identifying a first optimum value of the input transfer size parameter;

whilst transmitting using the first optimum value of the input transfer size parameter, measuring performance of transmission of data over the path using different values of the transfer data segment parameter and identifying a second optimum value of the transfer data segment parameter; and requesting data from the data source using the first optimised value of the input transfer size parameter to indicate an amount of data requested and using the value of the second optimum value of the transfer data segment parameter to form data segments from data stored in the cache for transmission over the path.

22. A non-transitory computer-readable storage medium having stored thereon computer-readable code, which, when executed by computing apparatus, causes the computing apparatus to perform a method comprising:

initialising a value of an input transfer size parameter;
initialising a value of a transfer data segment parameter;
requesting data from a data source, the requesting using the value of the input transfer size parameter to indicate an amount of data requested;

storing data received from the data source in a cache;

using the value of the transfer data segment parameter to form a data segment from data stored in the cache;

transmitting the data segment using multiple logical connections of a transfer path, each logical connection carrying a different part of the data segment;

when it is confirmed that the data segment has been transmitted over the transfer path, deleting the data segment from the cache;

measuring performance of transmission of data over the path using different values of the transfer data segment parameter and identifying a first optimum value of the transfer data segment parameter;

whilst transmitting using the first optimum value of the transfer data segment parameter, measuring performance of transmission of data over the path using different values of the input transfer size parameter and identifying a first optimum value of the input transfer size parameter;

whilst transmitting using the first optimum value of the input transfer size parameter, measuring performance of transmission of data over the path using different values of the transfer data segment parameter and identifying a second optimum value of the transfer data segment parameter; and requesting data from the data source using the first optimised value of the input transfer size parameter to indicate an amount of data requested and using the value of the second optimum value of the transfer data segment parameter to form data segments from data stored in the cache for transmission over the path.

* * * * *

UNITED STATES PATENT AND TRADEMARK OFFICE
CERTIFICATE OF CORRECTION

Page 1 of 1

PATENT NO. : 10,264,105 B2
APPLICATION NO. : 15/574035
DATED : April 16, 2019
INVENTOR(S) : David Trossell It is certified that error appears in the above-identified patent and that said Letters Patent is hereby corrected as shown below:

On the Title Page

Item (73):
Delete "Bridgework Limited" and insert --Bridgeworks Limited--

Item (57), Line 6:
After "path", insert --;--

In the Claims

Column 26, Line 55:
In Claim 20, after "and", insert --e)--

Signed and Sealed this
Tenth Day of September, 2019

Andrei Iancu
*Director of the United States Patent and Trademark Office*